UNITED STATES PATENT OFFICE.

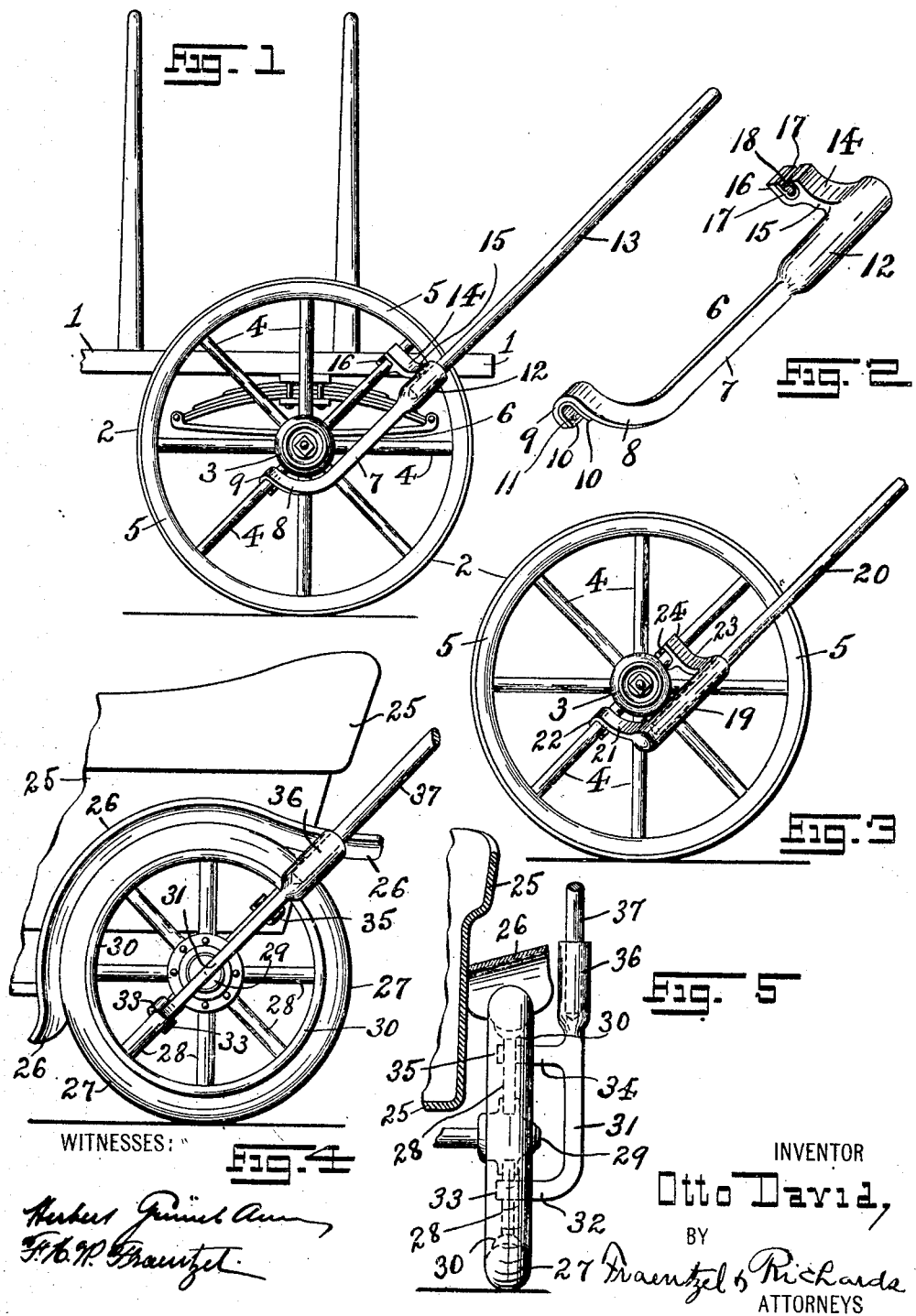

OTTO DAVID, OF NEW YORK, N. Y.

VEHICLE-STARTER.

No. 913,625.  Specification of Letters Patent.  Patented Feb. 23, 1909.

Application filed March 20, 1908. Serial No. 422,222.

*To all whom it may concern:*

Be it known that I, OTTO DAVID, subject of the Emperor of Germany, residing at New York, in the county of New York and State of New York, have invented certain new and useful Improvements in Vehicle-Starters; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference generally, to improvements in vehicle-starters; and the invention relates more particularly to a novel tool which is adapted to engage with the wheel of a vehicle, or the like, for the purpose of starting the same if said vehicle should become stalled or caught in ruts, car-tracks, or the like.

The invention has for its principal object to provide a novel tool which is of simple and strong construction, and which may be caused to engage with the spokes of a wheel of a wagon, automobile, or other vehicle, and by means of which force may be applied thereto by the leverage of said tool for the purpose of starting or moving the said wagon, automobile, or other vehicle, if the same should become stalled or caught in ruts, car-tracks, or depressions in the road over which the said vehicle is moving.

Another object of the present invention is to provide a novel tool for the purposes above set forth, which may be carried around in the vehicle without any inconvenience and which may be finally and easily applied to the wheel of the vehicle for the purposes above mentioned.

The invention consists, primarily, in the novel vehicle-starter, hereinafter more fully set forth; and, furthermore, this invention consists in the novel arrangements and combinations of the devices and parts, as well as in the details of the construction of the same, all of which will be more fully described in the following specification, and then finally embodied in the clauses of the claim, which are appended to this specification and which form an essential part of the same.

The invention is clearly illustrated in the accompanying drawings, in which:—

Figure 1 is a side view of one end of a wagon or truck, illustrating in connection therewith the novel vehicle-starter, embodying the principles of the present invention, applied to the wheel thereof in its operative relation thereto. Fig. 2 is a perspective view of the said novel vehicle-starter, the handle or lever portion being removed. Fig. 3 is a side elevation of a vehicle-wheel, and illustrates in connection therewith a slightly modified construction of vehicle-starter embodying the principles of the present invention. Fig. 4 is a side elevation of one end of an automobile, and illustrates in connection therewith another slightly modified construction of vehicle-starter, embodying the principles of this invention. Fig. 5 is a vertical section of a portion of the automobile shown in said Fig. 4, the wheel being shown in elevation and the novel vehicle starter applied in its operative relation with the said wheel.

Similar characters of reference are employed in all of the above described views to indicate corresponding parts.

Referring now to the several figures of the said drawings, the reference-character 1 indicates a wagon, truck or other vehicle, mounted on the usual wheels 2, said wheels 2, being provided with the usual hub 3 and radiating spokes 4, the latter terminating in the rim 5. Applied to the said wheel 2, and in operative relation therewith, is the novel vehicle-starter 6, the same comprising a main body-portion 7 provided at its lower end with a curved arm 8. Secured to the free end of the said curved arm 8, and preferably being formed integrally therewith, is a hook-shaped member or element 9. This said hook-shaped member or element 9 is provided upon its inner concave surface with a lining or veneer 10 of resilient or non-scratching material, such as rubber, leather or any other suitable substance, the same being secured in place by means of screws, rivets, or the like, 11. This hook-shaped member or element 9 is adapted to engage with one of the spokes 4 of the wheel 2, at a point near the hub 3, and the lining or veneer 10 is adapted to provide a gripping surface which will not mar, scratch or otherwise injure the paint or varnish of the said spokes 4, when the said vehicle-starter 6 is applied to the wheel 2.

Secured to the upper portion of the main body-portion 7 of the vehicle-starter 6, and being preferably formed integral therewith, is a cylindrical socket-member 12 adapted to receive the one end of a handle or lever-member 13. Integrally formed upon the upper end of said cylindrical socket-member 12 and extending outwardly at right angles therefrom is an arm or projection 14. This said arm or projection 14 is formed with a slight downward dip or curved portion 15 which allows, (when the tool is in operative use,) the said cylindrical socket member 12 to clear the rim 5 of the wheel 2. The free end of said arm or projection 14 is provided with a forked member 16. This said forked member 16 is provided upon its inner concave surface with a lining or veneer 17 of resilient or non-scratching material, such as rubber, leather, or any other suitable substance, the same being secured in place by means of screws, rivets or the like 18. This said forked member 16 is adapted to engage with the spoke 4 opposite to that engaged by the hook-shaped member or element 9 and at a point near the rim 5 of the wheel 2, the lining or veneer 17 serving to prevent any scratching or other injury to the paint or varnish thereof.

It will be clearly evident, from an inspection of the drawings, that the novel tool or vehicle-starter above described will readily provide a means for finally gripping the wheel of a stalled vehicle; and, applying thereto a force increased in efficiency by the leverage provided by the said tool, will greatly aid in moving or starting the said vehicle when the same becomes stalled or caught in ruts, depressions, or car-tracks, and the like.

Referring now more particularly to Fig. 3 of the drawings, there is illustrated therein a slightly modified construction of vehicle-starter embodying the principles of this invention. This construction comprises a cylindrical socket-member 19 adapted to receive the handle or lever-arm 20. Extending at right angles from the lower end of said cylindrical socket-member 19 is an arm 21 provided with a slight downward curve. Secured to the free end of this arm 21, and preferably formed integral therewith, is a hook-shaped member 22 adapted to engage a spoke 4 of the wheel 2 at a point near the hub 3. In like manner, the upper end of said cylindrical socket-member 19 is provided with an arm 23 extending at right angles therefrom and being provided with a slight downward curve. This said arm 23 is provided at its free end with a forked member 24 adapted to engage with a spoke 4 of the wheel 2 at a point near the hub 3, and in the manner shown. The downward curves of the arms 21 and 23 are provided to permit the cylindrical socket-member 19 and its handle or lever member 20 to properly clear the spokes 4 and rim 5 of the wheel 2 when the vehicle-starter is in use. It will also be clearly understood, that linings or veneers or resilient material may also be provided upon the concave surfaces of the hook-shaped member 22 and the forked member 24 to prevent scratching or injury to the paint or varnish of the said spokes 4.

Referring now more particularly to Figs. 4 and 5 of the drawings, there is illustrated therein another slight modification of the novel vehicle-starter. In this construction, the vehicle-starter is designed more particularly for use with automobiles, carriages, and the like, which are provided with mud-guards covering the wheels thereof and which it is necessary that the lever-arm of the vehicle-starter should clear when in operation. The reference character 25 represents an automobile or similar vehicle, provided with mud guards 26 over its wheels 27. The wheels 27 are provided with the usual spokes 28 radiating from a hub 29 and terminating in a rim 30. The vehicle tool adapted to be used with such a vehicle comprises a main body-portion 31 which is provided at its lower end with an arm 32 extending at right angles therefrom, this arm 32 being formed with a hook-shaped member 33 at its free end, and is adapted to engage with one of the spokes 28 at a point near the hub 29 of the wheel 27. At a proper distance above the arm 32, the main body-portion 31 is provided with another arm 34 extending at right angles thereto. The free end of this arm 34 is provided with a hook-shaped member 35 the "hook" extending in an opposite direction to that of the hook-shaped member 33. This said hook-shaped member 35 is adapted to engage with one of the spokes 28 at a point near the rim 30 of the wheel 27. These said hook-shaped members may be provided upon their inner concave surfaces with the lining or veneer of resilient or non-scratching material to protect the paint or varnish of the spokes 28 when brought in contact therewith. Secured upon the upper portion of said main body-portion 31, and preferably integral therewith, is a cylindrical socket-member 36 adapted to receive the handle or lever-member 37.

I am aware that changes may be made in the various arrangements and combinations of parts, as well as in the details of the construction of the same, without departing from the scope of the present invention, as defined in the appended claims. Hence, I do not limit my invention to the exact arrangements and combinations of the devices and parts, as illustrated in the accompanying drawings, and as described in the accompanying specification, nor do I confine myself to the exact details of the constructions of the said parts.

I claim:—

1. A device of the character described, comprising a receiving socket-member, a lever arm retained in said receiving socket-member, and means connected with said receiving socket-member for gripping the spokes of a vehicle-wheel, substantially as and for the purposes set forth.

2. A device of the character described, comprising a receiving socket-member, a lever-arm retained in said receiving socket-member, a downwardly extending body-portion connected with said receiving socket-member, and means connected with said receiving socket-member and its downwardly extending body-portion for gripping the spokes of a vehicle-wheel, substantially as and for the purposes set forth.

3. A device of the character described, comprising a receiving socket-member, a lever-arm retained in said receiving socket-member, a downwardly extending body-portion connected with said receiving socket-member, arms extending at right angles from said receiving socket-member and from said body-portion, and means connected with the free ends of said arms for gripping the spokes of a vehicle-wheel, substantially as and for the purposes set forth.

4. A device of the character described, comprising a main body-portion provided with a receiving socket-member, a lever-arm retained in said receiving socket-member, an arm secured to and extending at right angles from said main-body portion, a hook-shaped member or element formed upon the free end of said arm and adapted to grip a spoke of a vehicle-wheel, an arm secured to and extending at right angles from said receiving-socket member, and a fork-shaped member formed upon the free end of said arm and adapted to grip a spoke of a vehicle-wheel, substantially as and for the purposes set forth.

5. A device of the character described, comprising a main body-portion provided with a receiving socket-member, a lever-arm retained in said receiving socket-member, an arm secured to and extending at right angles from said main body-portion, a hook-shaped member or element formed upon the free end of said arm and adapted to grip a spoke of a vehicle-wheel, an arm secured to and extending at right angles from said receiving socket-member, a fork-shaped member formed upon the free end of said arm and adapted to grip a spoke of a vehicle wheel, and a lining or veneer of resilient non-scratching material secured upon the inner concave surfaces of said hook-shaped member or element and said fork-shaped member, substantially as and for the purposes set forth.

6. A device of the character described, comprising a main body-portion provided with a receiving socket-member, a lever-arm retained in said receiving socket-member, a gripping member connected with said main body-portion at its lower end, the same being adapted to grip a spoke of a vehicle-wheel, and a gripping-member connected with the upper end of said main body-portion, the same being adapted to grip the opposite radiating spoke of a vehicle wheel, substantially as and for the purposes set forth.

7. A device of the character described, comprising a main body-portion provided with a receiving socket-member, a lever-arm retained in said receiving socket-member, a gripping member connected with said main body-portion at its lower end, the same being adapted to grip a spoke of a vehicle-wheel, and a gripping-member connected with the upper end of said main body-portion, the same being adapted to grip the opposite radiating spoke of a vehicle-wheel, and means connected with said gripping member adapted to prevent marring or scratching said spokes of the vehicle-wheel, substantially as and for the purposes set forth.

8. A device of the character described, comprising a main body-portion provided with a receiving socket-member, a lever-arm retained in said receiving socket-member, a gripping member connected with said main body-portion at its lower end, the same being adapted to grip a spoke of a vehicle-wheel, and a gripping-member connected with the upper end of said main body-portion, the same being adapted to grip the opposite radiating spoke of a vehicle-wheel, means connected with said gripping member adapted to prevent marring or scratching said spokes of the vehicle-wheel, the same comprising a lining or veneer of resilient non-scratching material covering said gripping-member, substantially as and for the purposes set forth.

9. A device of the character described, comprising a lever-arm, and a pair of gripping members connected with said lever-arm and adapted to engage with oppositely radiating spokes of a vehicle-wheel, substantially as and for the purposes set forth.

10. A device of the character described, comprising a lever-arm, a hook-shaped member and a fork-shaped member connected therewith, the same being adapted to engage with oppositely radiating spokes of a vehicle-wheel, substantially as and for the purposes set forth.

11. A device of the character described, comprising a lever arm, a hook-shaped member and a fork-shaped member connected therewith, the same being adapted to engage with oppositely radiating spokes of a vehicle-wheel, and means connected with said hook-shaped member and said fork-shaped member to prevent the marring or scratching of the spokes of the vehicle wheel when in engagement therewith, substantially as and for the purposes as set forth.

12. A device of the character described, comprising a lever-arm, a hook-shaped member and a fork-shaped member connected therewith, the same being adapted to engage with oppositely radiating spokes of a vehicle-wheel, means connected with said hook-shaped member and said fork-shaped member to prevent the marring or scratching of the spokes of the vehicle-wheel when in engagement therewith, the same comprising a lining or veneer of resilient non-scratching material secured upon the inner concave surfaces of said hook-shaped and said fork-shaped members, substantially as and for the purposes set forth.

13. A device of the character described, comprising a main body-portion provided with a receiving socket-member, a lever-arm retained in said receiving socket-member, a curved arm extending from the lower end of said main body-portion, a hook-shaped member formed upon the free end of said curved arm and adapted to engage with a spoke of a vehicle-wheel near the hub of said wheel, an arm extending at right angles from the receiving socket-end of said main body-portion and curved in a downward direction, and a forked-member formed on the free end of said arm and adapted to engage with an opposite radiating spoke of a vehicle-wheel, near the rim of said wheel, substantially as and for the purposes set forth.

14. A device of the character described, comprising a main body-portion provided with a receiving socket-member, a lever-arm retained in said receiving socket-member, a curved arm extending from the lower end of said main body-portion, a hook-shaped member formed upon the free end of said curved arm and adapted to engage with a spoke of a vehicle-wheel near the hub of said wheel, an arm extending at right angles from the receiving socket-end of said main body-portion and curved in a downward direction, a forked-member formed on the free end of said arm and adapted to engage with an opposite radiating spoke of a vehicle-wheel, near the rim of said wheel, and means connected with said hook-shaped and said fork-shaped members to prevent the marring or scratching of the spokes of the said vehicle-wheel when in engagement therewith, substantially as and for the purposes set forth.

15. A device of the character described, comprising a main body-portion provided with a receiving socket-member, a lever-arm retained in said receiving socket-member, a curved arm extending from the lower end of said main body-portion, a hook-shaped member formed upon the free end of said curved arm and adapted to engage with a spoke of a vehicle-wheel near the hub of said wheel, an arm extending at right angles from the receiving socket-end of said main body-portion and curved in a downward direction, a forked-member formed on the free end of said arm and adapted to engage with an opposite radiating spoke of a vehicle-wheel, near the rim of said wheel, and means connected with said hook-shaped and said fork-shaped members to prevent the marring or scratching of the spokes of the said vehicle-wheel when in engagement therewith, the same comprising a lining of veneer or resilient non-scratching material secured upon the inner concave surfaces of said hook-shaped and said fork-shaped members, substantially as and for the purposes set forth.

In testimony, that I claim the invention set forth above I have hereunto set my hand this 14th day of March, 1908.

OTTO DAVID.

Witnesses:
HERBERT GWINN AUE,
GEORGE D. RICHARDS.